UNITED STATES PATENT OFFICE.

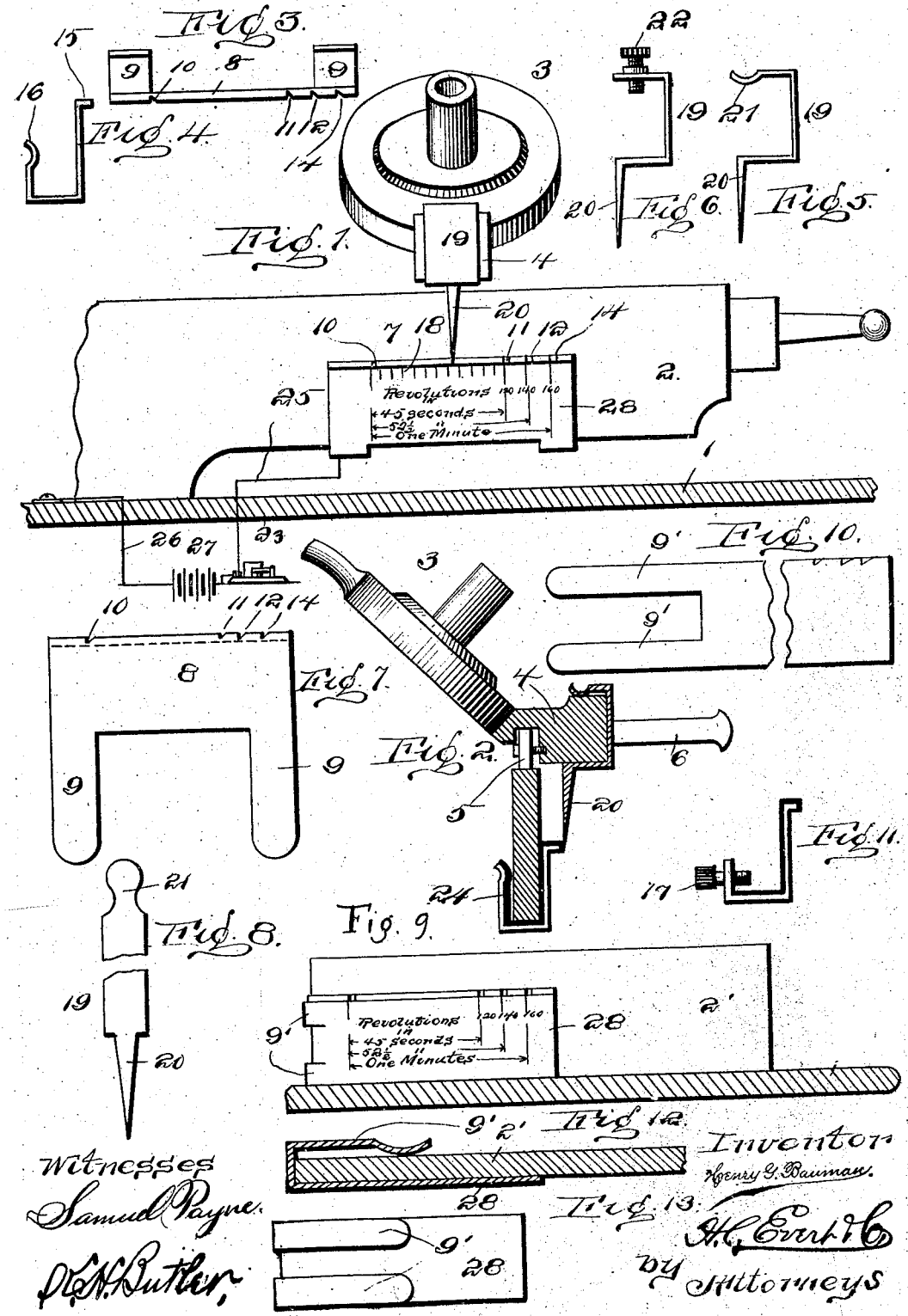

HENRY G. BAUMAN, OF PITTSBURG, PENNSYLVANIA.

PHONOGRAPH.

No. 842,059.　　　　Specification of Letters Patent.　　　　Patented Jan. 22, 1907.

Application filed February 26, 1906. Serial No. 302,988.

*To all whom it may concern:*

Be it known that I, HENRY G. BAUMAN, a citizen of the United States of America, residing at Pittsburg, in the county of Allegheny and State of Pennsylvania, have invented certain new and useful Improvements in Phonographs, of which the following is a specification, reference being had therein to the accompanying drawings.

This invention relates to certain new and useful improvements in indicators for phonographs, graphophones, and like reproducing-machines.

The primary object of this invention is to provide a speed or revolution indicator for phonographs or like machines that will admit of adjusting the spindle of the machine to the same speed as was used in making the records, thereby insuring a clear and harmonious rendition of the music or speech in reproduction.

To this end my invention aims to provide a simple, inexpensive, and durable indicator or register for phonographs that can be readily applied to the present type of phonographs by unskilled persons, thus permitting of the owners of phonographs obtaining the indicators and applying them for the purposes above specified.

It is a well-known fact that records are made to one hundred and twenty, forty, and sixty revolutions. This makes it necessary to adjust the machine so it will travel or carry the speaker-arm to some given distances in seconds and to other distances in minutes. With my improved indicator attached to the phonograph the operator can quickly and accurately regulate the speaker-arm to make the proper number of revolutions, no matter at what speed the record was recorded.

While the speed at which the record is made is known to the purchaser, there is no indicating device on the machine to show at what speed or number of revolutions the spindle is making, and while the machine may be regulated to a faster or slower speed it is necessary to use a device to indicate and regulate the revolutions to the same speed required to reproduce as that which was used in making the record.

My improved indicator permits of a clear rendition of the piece of music being reproduced by the phonograph-record, this being accomplished by observing the number of revolutions or the speed at which the record traveled when receiving the piece of music, and when the record is placed upon a phonograph equipped with my improved indicator the indicator will designate the speed at which the record should travel in order to correctly reproduce the piece of music carried by the record.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a front elevation of the slide-rest of a phonograph equipped with my improved indicator, also illustrating a portion of the speaker-arm. Fig. 2 is a vertical sectional view of the same. Fig. 3 is a plan of the indicator-plate. Fig. 4 is an end view of the same. Fig. 5 is a side elevation of a pointer used in connection with the indicator. Fig. 6 is a similar view illustrating a slightly-modified form of construction. Fig. 7 is a developed view of the indicator-plate. Fig. 8 is a similar view of the indicator-pointer. Fig. 9 is a front elevation of a slide-rest of a phonograph, illustrating the same equipped with a slightly-modified form of indicator. Fig. 10 is a developed view of the indicator illustrated in Fig. 9 of the drawings. Fig. 11 is an end view of the indicator-plate illustrated in Fig. 1 of the drawings, illustrating a slightly-modified form of fastening means used in connection with the same. Fig. 12 is a longitudinal sectional view of the slide-rest and indicator illustrated in Fig. 9 of the drawings. Fig. 13 is a rear elevation of the indicator-plate illustrated in Figs. 9 and 12 of the drawings.

In the accompanying drawings I have illustrated the bed-plate 1 of a phonograph as having an elevated slide-rest 2. In connection with the bed-plate and the slide-rest I have also illustrated the usual arm and diaphragm 3 of a phonograph, commonly known as the "speaker." The speaker is provided with an outwardly-extending arm 4, the rear face of which is provided with a roller 5, that travels upon the top edge of the slide-rest when the phonograph is in operation. The arm 4 is also provided with an outwardly-extending handle 6, by which the speaker is manipulated when out of engagement with the record of the phonograph.

My invention resides in providing the slide-rest with an indicator 7, the indicator being constructed of a metallic plate 8, carrying side prongs 9 9 at each end thereof. The side of the plate 8 opposite the prongs 9 9 is notched, as at 10, 11, 12, and 14. This side of the plate is bent at right angles to form a flange 15, as clearly illustrated in Figs. 1, 2, and 4 of the drawings. The prongs 9 9 are bent rearwardly and upwardly to embrace the lower edge of the slide-rest, the extreme end of the prongs being curved, as at 16 16, to engage against the rear side of the slide-rest 2. The prongs 9 9 are made resilient, whereby they will firmly embrace the lower edge of the slide-rest and retain the indicator-plate 8 in engagement therewith. The curved portion of the prongs 9 9 can be dispensed with and set-screws 17 17 employed for retaining the indicator-plates in engagement with the slide-rest. (See Fig. 11.)

Upon the indicator-plate, adjacent to the flange 15 thereof, are arranged graduations 18, these graduations being spaced whereby one and six-tenths inches will represent one hundred and sixty revolutions per minute of the phonograph-record, one and four-tenths inches will represent one hundred and forty revolutions in fifty-two and one-half seconds, and one and two-tenths inches will represent one hundred and twenty revolutions in forty-five seconds. The graduations corresponding to the notches 11, 12, and 14 are marked "120," "140," and "160," respectively, while upon the plate are printed the words "Revolutions in 45 seconds," "52½ seconds," and "1 minute," suitable arrows or dashes being printed upon the plate to indicate that the "45 seconds" designates one hundred and twenty revolutions, "52½ seconds" designates one hundred and forty revolutions, and "1 minute" designates one hundred and sixty revolutions.

In connection with the speaker-arm 4 I use a metallic pointer 19, said pointer being constructed to form a yoke having a depending needle 20, adapted to travel upon the front edge of the flange 15 of the indicator-plate. In this instance the pointer 19 has its upper end curved, as at 21, in order that it may be clamped upon the speaker-arm; but a set-screw 22 (see Fig. 6) can be readily used for clamping the pointer thereon.

When a phonograph is in operation, the speaker-arm is adapted to carry the needle 20 along the indicator-plate, and by observing said plate it can be determined whether the phonograph is properly operated to reproduce a clear interpretation of the piece of music of the phonograph-record. In placing the pointer 19 upon the speaker-arm I arrange the needle 20 thereof whereby it will engage the front edge of the flange 15 of the indicator-plate with a slight pressure, whereby when the needle reaches the notches 11, 12, and 14 it will recede into one of said notches and create a click or noise which will attract the operator's attention in order that the number of revolutions at which the machine is traveling may be observed.

In Fig. 1 of the drawings I have illustrated a "telegraph-sounder" 23 as being used in connection with the indicator-plate, whereby the sounder may give alarm when the needle has reached either of the notches 11, 12, or 14. To accomplish this, a suitable insulation 24 is inserted between the slide-rest 2 and the indicator-plate, and a wire 25 is connected to the indicator-plate and to the sounding instrument, while another wire 26 connects the instrument with a battery 27 and the base-plate 1 of the machine. In lieu of the sounding instrument 23 an electric bell may be used.

In Figs. 9, 10, 12, and 13 I have illustrated a portion of the phonograph as having an integral base-plate 1' and a slide-rest 2'. I have therefore devised an indicator-plate 28 similar in construction to the plate heretofore described, with the exception that the lugs 9' 9' are formed at the end of the plate, whereby said lugs may be bent around the end of a slide-rest to retain the indicator-plate in position upon said rest, otherwise the plate being identical in construction to the indicator-plate heretofore described, and illustrated in Fig. 1 of the drawings.

From the foregoing description, taken in connection with the drawings, it will be observed that my improved indicator is extremely simple in construction and can be readily applied to various forms of phonographs by unskilled labor, and by observing the indicator and regulating the governor of the phonograph in accordance therewith a correct rendition or interpretation of a record of music can be obtained.

The click or noise created by the needle receding into one of the notches of the indicator-plate permits of the operator giving his entire attention to the watch or timepiece when timing the speaker-arm, making it unnecessary to observe the indicator-plate and watch at the same time to see when the needle arrives at the starting-point or one of the notches for the finish. The graduations of the indicator-plate are arranged in tenths, and twelve tenths of an inch are adapted to indicate that the record has traveled one hundred and twenty revolutions in forty-five seconds, and should the catalogue of the records state that a record is to travel one hundred and sixty revolutions the machine can be easily and quickly adjusted to permit of a clear rendition or interpretation of the record. The telegraph-sounder is used for the same purpose, so that the click of the needle may be electrically or mechanically indicated.

Such changes in the construction and operation of the indicator as are permissible by the appended claims may be resorted to without departing from the spirit and scope of the invention.

What I claim, and desire to secure by Letters Patent, is—

1. The combination with the slide-rest and speaker-arm of a phonograph, of a depending needle detachably connected to said speaker-arm, a graduated plate connected to said slide-rest and in circuit with a battery and sounder, substantially as described.

2. In an indicator, the combination with the slide-rest and speaker-arm of a phonograph, of a depending needle detachably connected to said arm, an indicator-plate connected to said slide-rest and having notches formed therein, and graduations arranged thereon adapted to indicate the movement of said needle, substantially as described.

3. In an indicator, the combination with the speaker-arm and slide-rest of a phonograph, of a graduated plate detachably connected to said slide-rest a depending needle detachably connected to said speaker-arm and adapted to engage said plate, and means to sound an alarm when said needle reaches certain graduations, substantially as described.

4. In an indicator, the combination with the slide-rest and speaker-arm of a phonograph, of a plate connected to said slide-rest and having graduations arranged thereon, means carried by said speaker-arm to designate upon said plate the rapidity at which said arm is traveling, substantially as described.

In testimony whereof I affix my signature in the presence of two witnesses.

HENRY G. BAUMAN.

Witnesses:
A. M. WILSON,
H. C. EVERT.